(12) United States Patent
Kobayashi

(10) Patent No.: US 7,068,217 B2
(45) Date of Patent: Jun. 27, 2006

(54) POSITIONING DEVICE, MOBILE TERMINAL, POSITIONING METHOD, AND POSITIONING PROGRAM

(75) Inventor: Michio Kobayashi, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/040,997

(22) Filed: Jan. 21, 2005

(65) Prior Publication Data

US 2005/0184905 A1 Aug. 25, 2005

(30) Foreign Application Priority Data

Jan. 23, 2004 (JP) ............... 2004-016018

(51) Int. Cl.
*G01S 5/14* (2006.01)
(52) U.S. Cl. ............... 342/357.15; 342/357.13
(58) Field of Classification Search .......... 342/357.01, 342/357.06, 357.12, 357.08, 357.15, 357.13; 701/207, 213, 215
See application file for complete search history.

(56) References Cited

U.S. PATENT DOCUMENTS 6,617,980 B1 * 9/2003 Endo et al. ................. 340/905
6,816,734 B1 * 11/2004 Wong et al. ............. 455/456.1

FOREIGN PATENT DOCUMENTS

| JP | 06-118156 | 4/1994 |
|---|---|---|
| JP | 2001-133535 | 5/2001 |
| JP | 2001-235337 | 8/2001 |

* cited by examiner

*Primary Examiner*—Dao L. Phan
(74) *Attorney, Agent, or Firm*—Harness, Dickey & Pierce, P.L.C.

(57) ABSTRACT

A device and method are provided to reduce the time required for positioning by a GPS without allowing specific parties to occupy a communication channel. An initial location acquisition unit specifies a location of a broadcasting station based on a terrestrial digital broadcasting from the broadcasting station to set the location of the broadcasting station as an initial location for positioning in a positioning unit, and the positioning unit determines a present location by receiving a radio wave from a GPS satellite.

10 Claims, 4 Drawing Sheets

| BROADCASTING STATION INFORMATION | | | LOCATION INFORMATION | | |
|---|---|---|---|---|---|
| LOCAL NO. | BROADCASTING STATION ID | FREQUENCY | LATITUDE | LONGITUDE | ALTITUDE |
| 1 | 110 | 1115 | 39.43 | 140.06 | 680 |
| 1 | 111 | 1145 | 38.15 | 140.2 | 120 |
| 1 | 112 | 1175 | 37.45 | 140.28 | 450 |
| 2 | 210 | 1105 | 35.36 | 140.06 | 257 |
| 2 | 220 | 1185 | 35.41 | 139.45 | 336 |
| 2 | 230 | 1195 | 35.26 | 139.38 | 224 |
| 2 | 240 | 1110 | 35.76 | 137.66 | 158 |
| 3 | 310 | 1140 | 36.41 | 137.13 | 247 |
| 3 | 320 | 1170 | 36.33 | 136.39 | 344 |
| 3 | 340 | 1180 | 36.03 | 136.13 | 547 |
| 4 | . | . | . | . | . |
| . | . | . | . | . | . |
| . | . | . | . | . | . |

FIG. 2

POSITIONING DEVICE, MOBILE TERMINAL, POSITIONING METHOD, AND POSITIONING PROGRAM

RELATED APPLICATIONS

This application claims priority to Japanese Patent Application No. 2004-016018 filed Jan. 23, 2004 which is hereby expressly incorporated by reference herein in its entirety.

BACKGROUND

1. Technical Field

The present invention relates to a positioning device, a mobile terminal, a positioning method, and a positioning program and particularly to those suitably used for a GPS (Global Positioning System).

2. Related Art

At present, as a ground position determination system, a GPS which is called NAVSTAR and operated by the U.S. government is known as disclosed in Parkinson, Bradford W Gilbert, Stephen W.; "NAVSTAR: Global Positioning System—Ten Years Later"; Proceedings of the IEEE; Vol. 71; No. 10. This GPS is a wireless navigation system which is designed for providing highly accurate three-dimensional information to a recipient on or near the ground, the GPS using a satellite as a transmitter.

Also, the former Union of Soviet Socialist Republics government operates a GPS known as GLONASS. Further, a system known as GALILEO is under development by the European Community. Recently, a GPS receiving device is used as a car navigation system.

Also, in JP-A-6-118156, for example, a method of downsizing the GPS receiving device to obtain a direction and a distance of a person's movement while the person is walking so that the person can carry the device is disclosed.

Further, JP-A-2001-133535, for example, discloses a method of reducing positioning time by using location information of a base station acquired by a PHS communication as an initial location for the positioning using the GPS.

JP-A-2001-235337, for example, discloses a method of reducing positioning time by using a field intensity map of a base station in a mobile communication network as an initial location for the positioning using the GPS.

However, in the method of reducing GPS positioning time by using the location information of the base station on the mobile communication network as the initial location, it is necessary to receive the location information by communicating with the base station or to store the location information of the base station in a GPS receiver. The method of communicating with the base station for the purpose of acquiring the location information of the base station has the problem of communication cost, thereby undesirably increasing a burden on a user. Also, the method of storing the location information of the base station in the GPS receiver has the problem that, in the case where multiple base stations exist at an interval of a several kilometers, a large memory capacity is required for storing the base stations.

Further, with the method of using the location information of the base station on the mobile communication network as the initial location, even in the case where the previous positioning information can be used as the initial location for the current positioning, it is necessary to confirm the location information of the base terminal by communicating again with the base terminal and to use the newly obtained location information of the base terminal as the initial location for the current positioning, thereby raising a problem of wasteful communication.

Accordingly, an object of the present invention is to provide a positioning device, a mobile terminal, a positioning method, and a positioning program capable of reducing the time required for positioning by a GPS without allowing specific parties to occupy a communication channel.

SUMMARY

In order to solve the above-described problems, according to this invention, there is provided a positioning device comprising: a positioning unit for positioning a present location by receiving a radio wave from a satellite; a communication unit for acquiring information indicating an originating location of a public communication or information for specifying the originating location of the public communication based on the public communication; and an initial location setting unit for setting an initial location to be used for the positioning based on the information acquired by the communication unit.

With such constitution, it is possible to pinpoint the present location of a user by using the receivable radio wave without specifying a recipient, and it is possible to approximate the initial location to be used for the positioning to the present location of the user without allowing specific parties to occupy the communication channel. Therefore, it is unnecessary to store the location information of multiple base stations on the mobile communication network for the purpose of acquiring the initial location for the positioning nor to allot a dedicated channel to the recipient, thereby suppressing a cost burden as well as reducing positioning time.

Further, according to this invention, the positioning device is characterized in that the initial location setting unit comprises: a first memory for storing the information acquired by the communication unit;

a second memory for storing a result of the positioning performed by the positioning unit; a comparison unit for comparing information acquired by the communication unit in a previous positioning with information acquired by the communication unit in a current positioning; and an estimation unit for estimating a distance between a current positioning location and a previous positioning location based on a result of the comparison, the previous positioning location being used as an initial location to be used for the current positioning in the case where the distance between the current positioning location and the previous positioning location is in a predetermined range.

With such constitution, by using the receivable radio wave without specifying the recipient, it is possible to estimate the distance between the current positioning location and the previous positioning location and to use the previous position location as the initial location to be used for the current positioning in the case where the current positioning location is not distant from the previous positioning location. Therefore, it is possible to approximate the initial location to be used for the current positioning to the present location of the user without acquiring the location information of the base stations on the mobile communication network and to reduce the positioning time with the cost burden being suppressed.

According to this invention, the positioning device is characterized in that the estimation unit uses at least one of the following: IDs of receivable broadcasting stations; number of the receivable broadcasting stations; field intensities of received radio waves; and received frequencies for the estimation of the distance between the current positioning location and the previous positioning location.

With such constitution, by using the receivable radio wave without specifying the recipient, it is possible to estimate the distance between the current positioning location and the previous positioning location.

According to this invention, the positioning device is characterized in that the public communication is analog radio broadcasting, digital radio broadcasting, analog TV broadcasting, digital TV broadcasting, or a road traffic information communication.

With such constitution, it is possible to specify an originating location of the public communication by receiving a radio wave transmitted based on the public communication with an accuracy of about a several hundreds of kilometers and to pinpoint the present location of the user with the accuracy of a several hundreds of kilometers. Therefore, it is possible to detect a distance between a satellite and a receiver accurately without receiving a Z count transmitted from the satellite, thereby making it possible to reduce the positioning time with the cost burden being suppressed.

According to this invention, the positioning device is characterized in that the digital TV broadcasting is terrestrial digital broadcasting.

With such constitution, it is possible to make it difficult to receive the radio wave using a cliff effect in an area which is distant from a broadcasting relay station by more than 150 km and to pinpoint the present location of the user with an accuracy of about 150 km. Therefore, it is possible to suppress the distance between the initial location to be used for the positioning and the present location of the user to be about 300 km or less, thereby making it possible to accurately detect the distance between the satellite and the receiver without receiving the Z count transmitted from the satellite. As a result, it is possible to reduce the positioning time with the cost burden being suppressed and to improve the positioning accuracy even in the case where it is impossible to receive the Z count.

According to this invention, the positioning device is characterized in that the information for specifying the originating location of the public communication is a broadcasting frequency of a broadcasting station or ID information of the broadcasting station.

With such constitution, it is possible to readily specify the originating location of the public communication by receiving the radio wave transmitted by the public communication and to pinpoint the present location of the user without a dedicated channel being allotted to the recipient.

According to this invention, the positioning device further comprising a correlation table wherein the broadcasting frequency of the broadcasting station or the ID information of the broadcasting station is correlated with location information of the broadcasting station or location information of a relay station of the broadcasting station.

With such constitution, it is possible to readily specify the originating location of the public communication without transmitting the location information directly through the radio wave transmitted from the public communication and to set the initial location near the present location of the user.

According to this invention, the positioning device is characterized in that the initial location setting unit sets the initial location to be used for the positioning based on a result of reference to the correlation table.

With such constitution, it is possible to specify a location of a broadcasting station even in the case where it is impossible to directly acquire the location information of the broadcasting station via the public communication, thereby making it possible to readily pinpoint the present location of the user.

According to this invention, there is provided a mobile terminal comprising: a positioning unit for positioning a present location by receiving a radio wave from a satellite; a communication unit for acquiring information indicating an originating location of a public communication or information for specifying the originating location of the public communication based on the public communication; an initial location setting unit for setting an initial location to be used for the positioning based on the information acquired by the communication unit; and a display for displaying a result obtained by the positioning unit.

With such constitution, it is possible to set the initial location near a present location of a user without allowing specific parties to occupy a communication channel and to rapidly display a result of the positioning with a cost burden being suppressed.

According to this invention, there is provided a positioning method comprising: a step of acquiring information indicating an originating location of a public communication or information for specifying the originating location of the public communication based on the public communication; a step of setting an initial location based on the information acquired by the communication unit; and a step of positioning a present location by receiving a radio wave from a satellite with the use of the set initial location.

With such constitution, by using the receivable radio wave without specifying the recipient, it is possible to set the initial position near the present location of a user and to reduce a positioning time with a cost burden being suppressed.

According to this invention there is provided a positioning program comprising causing a computer to execute: a step of acquiring information indicating an originating location of a public communication or information for specifying the originating location of the public communication based on the public communication; a step of setting an initial location based on the information acquired by the communication unit; and a step of positioning (determining) a present location by receiving a radio wave from a satellite with the use of the set initial location.

With such constitution, by causing the computer to execute the positioning program, it is possible to set the initial location near the present location of a user and to reduce a positioning time with a cost burden being suppressed.

BRIEF DESCRIPTION OF THE DRAWINGS

FIG. 2 is a diagram showing an example of a correlation table according to one embodiment of this invention.

DETAILED DESCRIPTION

Hereinafter, a positioning device and a positioning method according to embodiments of the present invention will be described with reference to the drawings.

Figure 1:
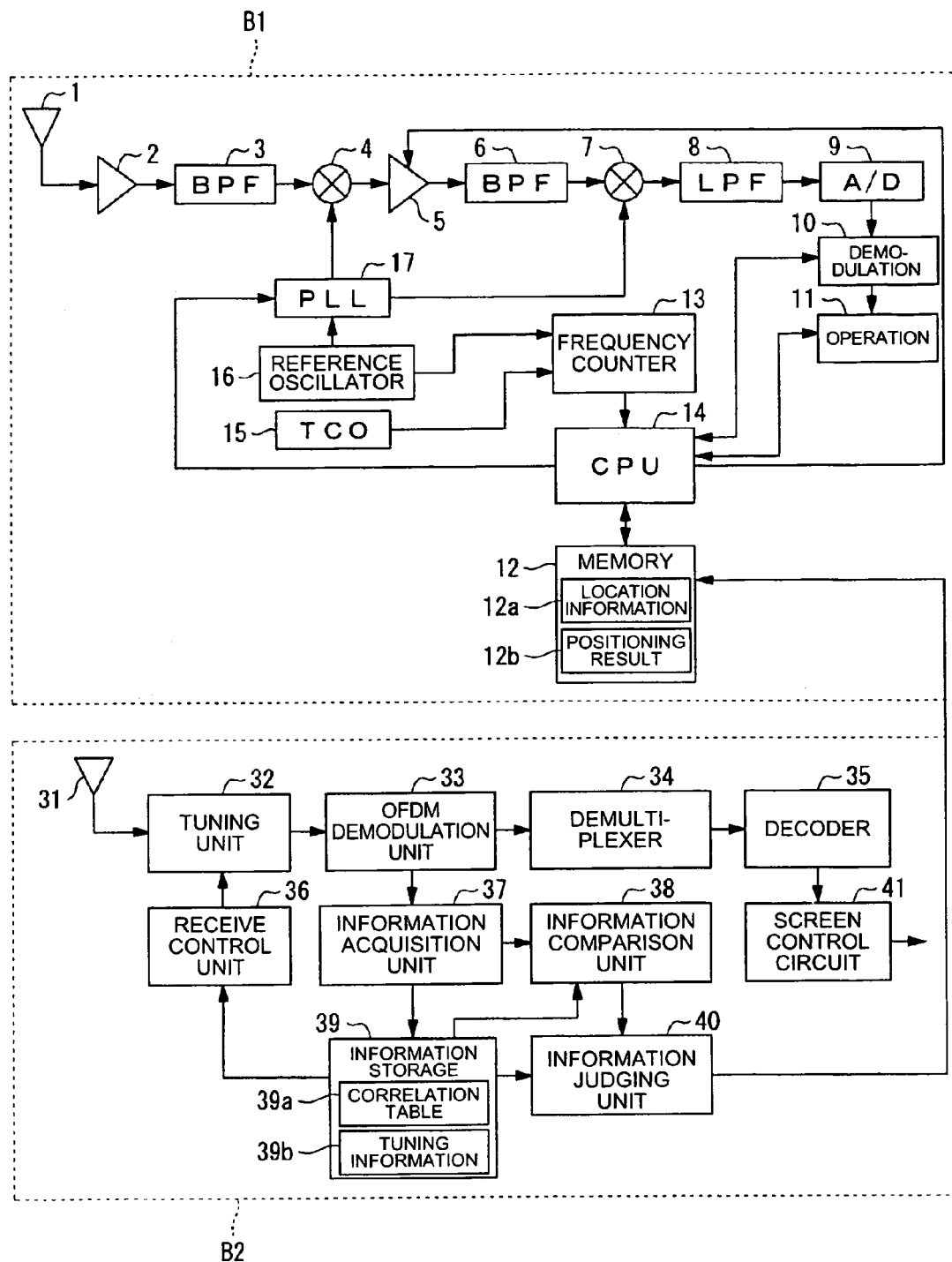
FIG. 1 is a block diagram showing a schematic constitution of a positioning device according to one embodiment of the present invention.

FIG. 1 is a block diagram showing a schematic constitution of a positioning device according one embodiment of this invention.

Referring to FIG. 1, the positioning device is provided with a positioning unit B1 and an initial location acquisition unit B2. The positioning unit B1 is provided with a GPS receiver and performs a positioning of a present location by receiving a radio wave from a GPS satellite. Also, the initial location acquisition unit B2 acquires information indicating an originating location of a public communication or information for specifying the originating location of the public communication based on the public communication to set the information as an initial location for the positioning performed by the positioning unit B1. Further, examples of the information for specifying the originating location of the public communication are a broadcasting frequency of a broadcasting station, ID information of a broadcasting station, and the like.

As used herein, the public communication means a wireless communication which is performed with the aim of direct receipt by the public, and the broadcasting is included in public communication. Also, as used herein, the public means the general public. As used herein, the broadcasting means a wireless communication which is performed with the aim that transmissions of an identical content are simultaneously received by the public. Examples of the broadcasting are analog radio broadcasting such as FM broadcasting and AM broadcasting; digital radio broadcasting; analog TV broadcasting; digital TV broadcasting; and the like. The digital TV broadcasting includes terrestrial digital broadcasting.

In the following description, the NAVSTAR GPS is used as a GPS for positioning and the terrestrial digital broadcasting is used as the public communication by way of example.

The initial location acquisition unit B2 is provided with a correlation table 39*a*, and it is possible to register correlation of broadcasting information such as broadcasting station IDs and broadcasting frequencies in the terrestrial digital broadcasting areas of all parts of a country with location information of the broadcasting stations in the correlation table 39*a*.

FIG. 2 is a diagram showing a constitution example of the correlation table 39*a* in which the correlation between the broadcasting station information and the location information according to one embodiment of this invention is registered.

Referring to FIG. 2, broadcasting station IDs and broadcasting frequencies for all local numbers (terrestrial broadcasting area numbers) are registered as the broadcasting information in the correlation table 39*a*. Also, location information of each of the broadcasting stations is registered in correlation with each of the broadcasting station IDs. A latitude, a longitude, and an altitude for indicating each of the broadcasting stations or a relay base of the broadcasting station may be included in the location information of the broadcasting station.

The NAVSTAR GPS has 24 GPS satellites orbiting the earth (4 GPS satellites exist in each of six separated circular orbits). 21 out of the 24 GPS satellites are in operation, and the other 3 GPS satellites are held in reserve. The satellite orbit is neither the polar orbit nor the equatorial orbit, but exists in inclined planes intersecting at right angles.

Each of the GPS satellites takes about 12 hours for orbiting the earth once. The earth takes 24 hours for rotating once about the earth axis. Therefore, each of the GPS satellites orbits the earth twice without fail during one rotation of the earth.

Positions of the GPS satellites at an arbitrary time are correctly known, and location information of each of the GPS satellites is transmitted to the earth constantly. The location information indicating the position in space with respect to the GPS time is known as astronomical ephemeris data (almanac and ephemeris).

A navigation signal transmitted from each of the GPS satellites includes an accurate transmission time thereof in addition to the astronomical ephemeris data including the almanac and the ephemeris. It is possible to determine a distance from the GPS receiver to the GPS satellite from the transmission time included in the navigation signal. That is to say, it is possible to calculate a transmission delay time of the navigation signal by using the transmission time of the navigation signal and a receipt time at which the GPS receiver received the navigation signal. Then, it is possible to obtain a pseudo distance from the GPS satellite which is transmitting the navigation signal to the GPS receiver by multiplying the transmission delay time of the navigation signal by a transmission speed of the navigation signal.

Here, since a clock of the GPS receiver is not perfectly synchronized with the GPS time, the transmission delay time of the navigation signal includes a certain offset time. Further, the signal transmission time delays due to the passage of the navigation signal through the atmosphere. Therefore, the pseudo distance includes a true distance from the GPS satellite to the GPS receiver, the offset time of the GPS receiver, the navigation signal transmission delay time, and an error from the GPS time of the clock mounted on the GPS satellite.

Since a three-dimensional position (x, y, and z) of the GPS receiver with respect to the center of the earth includes three unknown numbers, it is necessary to add at least 3 GPS satellites in order to obtain the three-dimensional position of the GPS receiver. It is possible to decide the position of the GPS receiver by triangulation using the two types of information (location information of the GPS satellite and pseudo distance) from each of the 3 GPS satellites.

In order to determine the present location of the GPS receiver using triangulation, the following 3 steps are required. First, it is necessary to determine the positions of the 3 GPS satellites which are in a visual field of the GPS receiver and included among the 24 GPS satellites orbiting the earth. Second, it is necessary to determine distances from the GPS receiver to the respective GPS satellites. Third, it is necessary to geometrically determine the position of the GPS receiver with respect to the center of the earth from the information obtained by the first and the second steps.

An estimated accuracy of the position of the GPS receiver depends on the number of selected GPS satellites and a geometrical arrangement of the GPS satellites in the sky. With an increase in the number of the GPS satellites used for the calculation of the position of the GPS receiver, the estimated accuracy of the position of the GPS receiver with respect to the center of the earth is increased.

However, as described in the foregoing, since the clock of the GPS receiver has a certain offset time to the GPS time, the offset time becomes a fourth unknown number in addition to the position of the GPS receiver. Therefore, in order to detect the position of the GPS receiver accurately, it is necessary to add 4 or more GPS satellites.

In the NAVSTAR GPS, a microwave using a single carrier wave frequency is used for transmitting the navigation signal. However, since the GPS satellites use modulated gold codes different from one another, it is possible to distinguish among the navigation signals transmitted from the GPS signals even in the case of adding 4 or more GPS satellites. Also, the carrier wave frequency is modulated by using a pseudo random number signal unique to each of the GPS satellites. Therefore, it is possible to identify the GPS satellites orbiting the earth by demodulating the navigation signal transmitted from each of the GPS satellites.

Further, the NAVSTAR GPS is provided with two modes for the carrier wave modulation using the pseudo random number signal.

In the first modulation mode, the carrier wave is modulated by a C/A signal, and this is called a coarse/acquisition mode or a C/A mode. The coarse/acquisition mode or the C/A mode is known as a standard position determination service.

This C/A signal is a gold code sequence having a chip frequency of 1.023 MHz. The chip is a pulse included in the pseudo random number code. The chip frequency of the pseudo random code sequence is a frequency by which the chip is generated in the sequence. Therefore, the chip frequency is equal to that obtained by dividing a code repetition frequency by the number of members in the code. In the C/A mode of the NAVSTAR GPS, 1023 chips are present in each of the gold code sequences, and the sequence is repeated every millisecond.

In turn, the second modulation mode is called an accurate mode, a protected mode, or a P (Protected) mode. In the P mode, a pseudo random number code has a chip frequency of 10.23 MHz. A P mode sequence is remarkably long, and one sequence is never shorter than 267 days. As a result, it is possible to determine a ground position of any type of GPS receiver with an accuracy (global error range) of substantially 16 meters. The P mode is known as an accurate position determination service. Confidentiality of the P mode sequence is maintained by the U.S. government, and the P mode is not for public use. Only the GPS receivers specially admitted by the U.S. government can use the P mode.

Thus, P mode modulated data are not for general use, and many GPS users use GPS data provided according to the C/A modulation mode.

There are two types of GPS satellite transmission frequencies, L1 (1.57542 GHz) and L2 (1.22760 GHz), and L1 is used for positionings in general. L1 is PSK (Phase Shift Keying) modulated by a pseudo noise code constituted of a synthetic wave of a C/A code for identifying a GPS satellite and navigation data such as orbital information and time information of the GPS satellite and then subjected to spectrum diffusion to be transmitted from the GPS satellite.

A GPS signal transmitted from the GPS satellite is received via an antenna 1. The GPS signal received via the antenna 1 is input to a low noise amplifier 2 to be amplified. The GPS signal amplified by the low noise amplifier 2 is input to a band-pass filter 3 where a desired frequency is extracted, followed by being output to a mixer 4.

In turn, a reference signal output from a reference oscillator 16 is input to a PLL circuit 17 to be divided, so that a frequency signal having a constant frequency is generated. The PLL circuit 17 is controlled by a CPU 14, and the frequency of the frequency signal generated by the PLL circuit 17 can be changed by controlling a division ratio or the like in the PLL circuit 17.

The frequency signal generated by the PLL circuit 17 is output to the mixer 4 to be mixed with the GPS signal output from the band-pass filter 3, so that the GPS signal having a predetermined frequency (1.5 GHz band) is down-converted (frequency conversion) into a first intermediate frequency signal.

The first intermediate frequency signal output from the mixer 4 is input to an auto gain control amplifier 5 to be amplified to a predetermined amplitude. The auto gain control amplifier 5 is controlled by the CPU 14 and capable of adjusting an amplification ratio of the auto gain control amplifier 5 depending on a state of a demodulation circuit 10. The first intermediate frequency signal amplified by the auto gain control amplifier 5 is input to a band-pass filter 6 where a desired frequency is extracted, followed by being output to a mixer 7.

The frequency signal generated by the PLL circuit 17 is output to the mixer 7 to be mixed with the first intermediate frequency signal output from the band-pass filter 6, so that the first intermediate frequency signal is down-converted into a second intermediate frequency signal. The PLL circuit 17 can output, to the mixer 7, a reference signal having a frequency lower than that of the reference signal output to the mixer 4.

The second intermediate frequency signal output from the mixer 7 is input to a low-pass filter 8 where a high frequency component is eliminated, followed by being output to an A/D converter 9. Then, the second intermediate frequency signal output from the low-pass filter 8 is digitized at the A/D converter 9, followed by being output to the demodulation circuit 10. Upon input of the second intermediate frequency signal, the demodulation circuit 10 performs demodulation processing of the GPS signal based on the control by the CPU 14.

In the demodulation circuit 10, spectrum reverse diffusion processing is performed by multiplying the digitized second intermediate frequency signal by a PN code (pseudo random code), and the signal subjected to the spectrum reverse diffusion processing is then subjected to BPSK demodulation to demodulate the GPS signal, so that the almanac data, the ephemeris data, and the GPS time data transmitted from the GPS satellite are obtained.

The PN code used in the spectrum reverse diffusion processing takes a value for each of the GPS satellites, and it is possible to select the GPS satellite to receive the GPS signal by selecting among the PN codes. It is possible to select the GPS satellite receiving the GPS signal based on the control by the CPU 14. Since the demodulation circuit 10 is capable of performing the demodulation processing for 8 to 16 channels simultaneously, it can simultaneously demodulate the GPS signals transmitted from a plurality of GPS satellites.

The transmission data demodulated by the demodulation circuit 10 is sent to an operation unit 11 so that a transmission time of each of the GPS signals transmitted from the GPS satellites is calculated and the position of each of the GPS satellites and information relating to correction values (troposphere correction value, ionosphere correction value, GPS time correction value) required for calculating distances between the respective GPS satellites and the GPS receiver are obtained. The operation unit 11 determines a present location of the GPS receiver and a correction time of the GPS time of the GPS receiver based on the thus-acquired information.

In this case, since the position of the GPS receiver includes the three unknown numbers (x, y, and z), it is necessary to calculate four unknown numbers including the correction time t of the GPS time of the GPS receiver. Therefore, GPS signals sent from four or more GPS satellites are usually required for the calculation for the positioning of the GPS receiver. In the case where the number of the GPS satellites used for the positioning calculation is 4, 4 simultaneous equations are created based on the data of corrected distances between the respective GPS satellites and the GPS receiver and the position data of the GPS satellites. By solving the 4 simultaneous equations, the present location of the GPS receiver and the correction time of the GPS time of the GPS receiver (offset value to GPS time) are determined.

Location information 12a which is used as an initial location for the positioning calculation performed by the operation unit 11 is stored in a memory 12, and the operation unit 11 performs the positioning calculation using the location information 12a as the initial location. When the present location of the GPS receiver is calculated by the operation unit 11, the CPU 14 stores a positioning result 12b in the memory 12.

In the case of performing the positioning calculation in the operation unit 11, it is possible to measure a frequency drift of the reference oscillator 16. More specifically, a TCO (Temperature Complimented Oscillator) 15 is provided near the reference oscillator 16. The TCO 15 functions as a temperature sensor and constitutes an RC oscillation circuit wherein a resistance called a thermistor whose resistance changes with a change in temperature, thereby changing an oscillation frequency depending on the temperature.

A frequency signal generated by the TCO 15 is input to a frequency counter 13, and a frequency of the reference oscillator 16 is measured. Then, the frequency measurement data obtained by the frequency counter 13 are input to the CPU 14, and the CPU 14 obtains a polynomial representing a relationship between an oscillation frequency of the TCO 15 and the frequency drift of the reference oscillator 16 by using the frequency measurement data output from the frequency counter 13 and the frequency drift of the reference oscillator 16 measured by the GPS positioning. Then, the CPU 14 stores a coefficient of the thus-obtained polynomial in the memory 12.

In turn, the terrestrial digital broadcasting is received via a terrestrial digital broadcasting antenna 31 to be input to a tuning unit 32. Upon input of broadcasting signals received by the terrestrial digital broadcasting antenna 31, the tuning unit 32 selects the broadcasting signal having a desired frequency based on a control by a receive control unit 36. The receive control unit 36 sweeps the received frequencies in the case of causing the tuning unit 32 to select the broadcasting signal, so that the tuning unit 32 judges which broadcasting station is receivable. Alternatively, the receive control unit 36 may cause the tuning unit 32 to select the broadcasting signal based on tuning information 39b stored in the information storage 39.

The broadcasting signal selected by the tuning unit 32 is input to an OFDM (Orthogonal Frequency Division Multiplex) demodulation unit 33, and the OFDM demodulation unit 33 demodulates the broadcasting signal selected by the tuning unit 32 to generate a TS (transport) signal.

The TS signal generated by the OFDM demodulation unit 33 is input to the demultiplexer 34 to be demultiplexed, so that the TS signal is separated into an image signal, a voice signal, a data signal, and an SI•PSI signal. The image signal and the voice signal separated by the demultiplexer 34 are input to a decoder 35 to be decoded, and the decoded image signal is output via a screen control circuit 41.

The TS signal generated by the OFDM demodulation unit 33 is input to an information acquisition unit 37, and the information acquisition unit 37 acquires a broadcasting station ID of the broadcasting station selected by the tuning unit 32 and intensity of the tuned radio wave from the TS signal. The information acquisition unit 37 sends the broadcasting station ID and the intensity of the tuned radio wave to an information comparison unit 38, while registering the local number, the broadcasting station ID, and the frequency in the information storage 39 as the tuning information 39b.

After acquiring the broadcasting station ID of the broadcasting station and the intensity of the tuned radio wave, the information comparison unit 38 refers to the correlation table 39a stored in the information storage 39 to confirm whether or not the broadcasting station ID acquired by the information acquisition unit 37 is registered in the correlation table 39a. In the case where the broadcasting station ID acquired by the information acquisition unit 37 is registered in the correlation table 39a, an information judging unit 40 refers to the correlation table 39a to acquire location information of the broadcasting station corresponding to the broadcasting station ID and stores the location information as the location information 12a to be used as the initial location for a positioning calculation in the memory 12.

In the case where a plurality of broadcasting stations have been selected by the tuning unit 32, the information judging unit 40 compares intensities of the tuned radio waves to acquire location information corresponding to the broadcasting station having the highest intensity radio wave from the correlation table 39a. Alternatively, the information judging unit 40 may select several broadcasting stations having relatively high radio wave intensities one by one in descending order of intensity to consider a position or the like of the selected broadcasting station, thereby selecting one of them. For instance, in the case where the ID of the broadcasting station having the highest radio wave intensity among the selected broadcasting stations is 112, a latitude of 37.45, a longitude of 140.28, and an altitude of 450 are stored in the memory 12 as the location information 12a.

Thus, by receiving the terrestrial digital broadcasting via the terrestrial digital broadcasting antenna 31, it is possible to pinpoint the present location of the GPS receiver and to approximate the initial location to be used for the positioning to the present location of the GPS receiver without allowing a specific GPS receiver to occupy the communication channel. Thus, it is no longer necessary to store the location information of many base stations on the mobile communication network for the purpose of acquiring the initial location for the positioning, and the necessity of allotting a dedicated channel between a GPS receiver and a base station is eliminated, thereby suppressing a cost burden and reducing a time required for the GPS receiver to perform the positioning.

Figure 3:
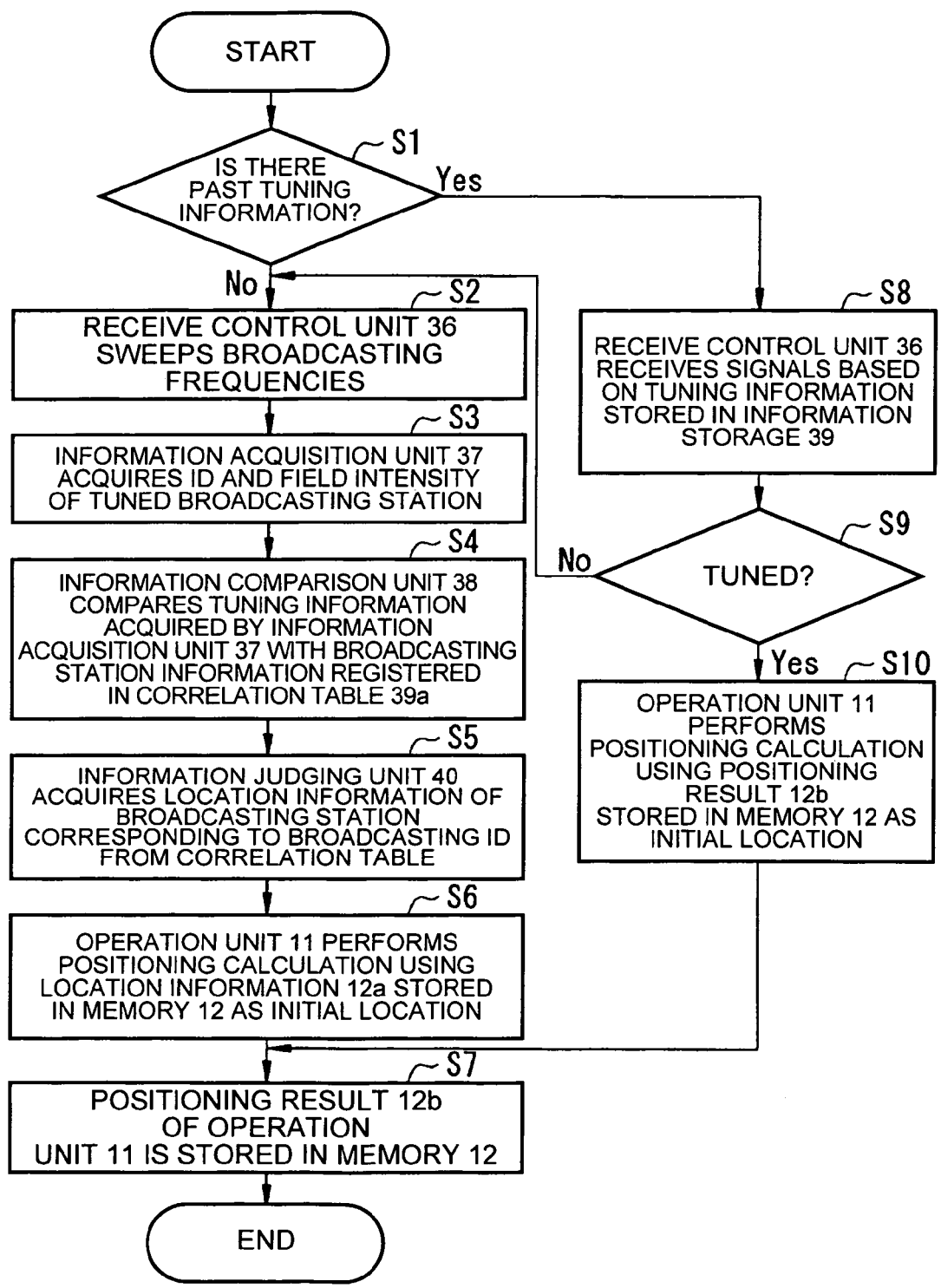
FIG. 3 is a flowchart showing an operation of the positioning device of FIG. 1.

FIG. 3 is a flowchart showing an initial location setting operation of the positioning device of FIG. 1.

Referring to FIG. 3, the receive control unit 36 in FIG. 1 judges (determines) whether or not past tuning information 39b is stored in the information storage 39 (step S1). In the case where the past tuning information 39b is not stored in the information storage 39, the receive control unit 36 causes the tuning unit 32 to sweep received frequencies to confirm which broadcasting station is receivable (step S2). In the case where the receive control unit 36 causes the tuning unit 32 to sweep the received frequencies, the frequencies to be swept may be in ascending order with an appropriate interval being placed between adjacent frequencies or the frequencies corresponding to the broadcasting station IDs stored in the information storage 39 may be selected one by one.

The tuning unit 32 causes the OFDM demodulation unit 33 to demodulate the broadcasting signal selected by the tuning unit 32 upon selection of the broadcasting station, so that a TS signal obtained by the demodulation is input to the information acquisition unit 37. Upon input of the TS signal generated by the OFDM demodulation unit 33, the information acquisition unit 37 acquires a broadcasting station ID and intensity of a radio wave from the TS signal (step S3) to register the broadcasting station ID and the frequency in the information storage unit 39 as a tuning information 39b and then sends the tuning information 39b to the information comparison unit 38.

Upon receipt of the tuning information 39b from the information acquisition unit 37, the information comparison unit 38 compares the tuning information 39b sent from the information acquisition unit 37 with the broadcasting station information registered in the correlation table 39a (step S4).

Then, the information judging unit 40 determines a broadcasting station which is an object for the location information acquisition based on a result of the comparison by the information comparison unit 38 and acquires location information of the determined broadcasting station by referring to the correlation table 39a (step S5). Then, the information judging unit 40 acquires the location information of the broadcasting station from the correlation table 39 to store the location information as location information 12a to be used as an initial location for a positioning calculation in the memory 12.

The operation unit 11 performs the positioning calculation by using the location information 12a stored in the memory 12 as the initial location (step S6). After the operation unit 11 calculates a present location of the GPS receiver, the CPU 14 stores the positioning result 12b in the memory 12 (step S7).

In the case where past tuning information 39b is stored in the information storage 39, the receive control unit 36 causes the tuning unit 32 to tune based on the previous tuning information 39b stored in the information storage 39 (step S8). In the case where the current tuning information 39b acquired by the information acquisition unit 37 is identical with the previous tuning information 39b stored in the information storage 39 (step S9), the information judging unit 40 judges that the GPS receiver is in an area which is identical with that determined in the previous positioning (that is, the GPS receiver is at a position which is 300 km or less from the position determined in the previous positioning) to inhibit the location information 12a of the currently selected broadcasting station from being stored in the memory 12.

The operation unit 11 performs a positioning calculation by using the location information 12a which has been stored in the memory 12 before as the initial location (step S10). After the operation unit 11 calculates a present location of the GPS receiver, the CPU 14 stores the positioning result 12b in the memory 12.

In the case where the current tuning information 39b acquired by the information acquisition unit 37 is not identical with the previous tuning information 39b stored in the information storage 39 (step S9), the receive control unit 36 causes the tuning unit 32 to tune to a broadcasting station by causing the tuning unit 32 to sweep the received frequencies to confirm which broadcasting station is receivable (step S2).

For instance, in the case where the broadcasting station IDs 110 and 112 have been tuned in the previous tuning but are not in the current tuning, the information acquisition unit 37 causes the tuning unit 32 to sweep the received frequencies to obtain the tuning information. In the case where the broadcasting station IDs currently acquired by the information comparison unit 38 are 310 and 340, the information judging unit 40 compares intensities of radio waves transmitted from the broadcasting stations of the broadcasting station IDs 310 and 340.

In the case where the intensity of the radio wave transmitted from the broadcasting station of the broadcasting station ID 340 is higher than that transmitted from the broadcasting station of the broadcasting station ID 310, the information judging unit 40 judges that the GPS receiver has moved to a broadcasting area having a local number of 3 from the broadcasting area having the local number of 1. The information judging unit 40 acquires location information of the broadcasting station of the broadcasting station ID 340 from the correlation table 39a to store the location information in the memory 12 as location information 12a to be use as an initial location for a positioning calculation.

Thus, by receiving the terrestrial digital broadcasting, it is possible to estimate the distance between the current positioning location and the previous positioning location, and, in the case where the current positioning location is not distant from the previous positioning location, it is possible to use the previous positioning result as the initial location to be used in the current positioning. Therefore, it is possible to approximate the initial location to be used in the current positioning to the present location of the GPS receiver without acquiring the location information of the base stations on the mobile communication network and to reduce the time required for the positioning by the GPS receiver with the cost burden being suppressed.

In the case of estimating the distance between the current positioning location and the previous positioning location, at least one of the following may be used: the receivable broadcasting stations; the number of the receivable broadcasting stations; the field intensities of the received radio waves; and the received frequencies.

Figure 4:
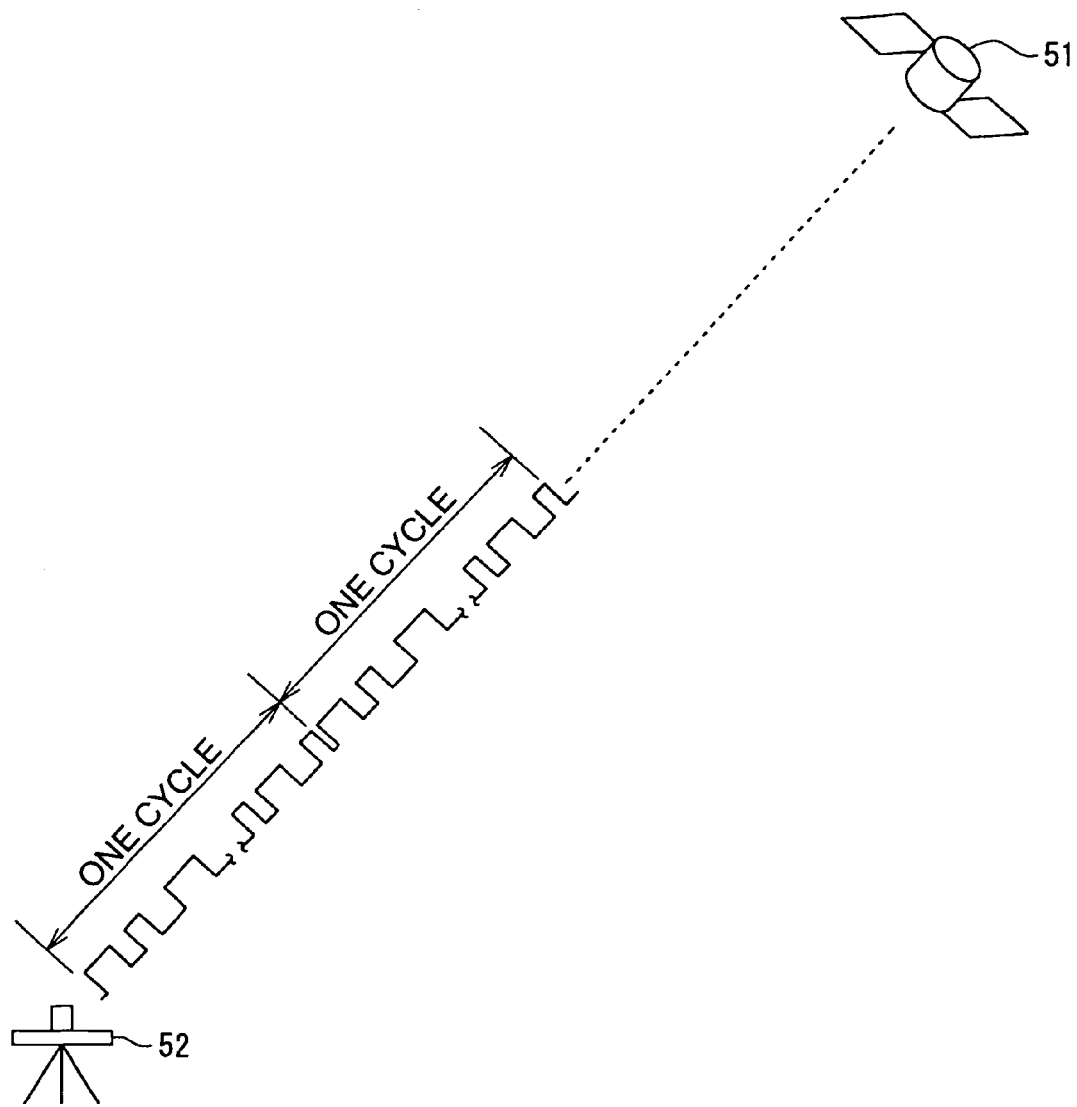
FIG. 4 is a diagram showing a multiple solution of C/A codes in a GPS.

FIG. 4 is an illustration of a multiple solution of a C/A code in a GPS.

Referring to FIG. 4, a pseudo distance modulated by a C/A code is used in single positionings in general. The C/A code has a bit rate of 1,023 Mbps, and its code length, i.e. the number of repetition bits in one code, is 1,023 bits which is equivalent to 1 ms in terms of time. Therefore, on the visual line connecting a GPS satellite 51 and a GPS receiver 52, C/A codes having an identical pattern are transmitted in such a fashion that they are aligned at an interval of 300 km which is equivalent to a distance that the radio wave travels in 1 ms.

Therefore, it is difficult to judge which one of the C/A codes should be used in the case of measuring an arrival time of the C/A code, and the measured pseudo distance includes indeterminacies occurring every 300 km in addition to the indeterminacy of the clock. However, since a schematic location of a user is known in the usages of the GPS receiver 52 on the ground and in the sky (because the distance between the center of the earth and the surface of the earth is about 6,370 km and the distance from the satellite 51 to the GPS 52 is about 26,600 km, so that the distance R from the satellite 51 to the GPS receiver 52 on the ground is in the range of 6,370 km<R<(6,370+300) km), a schematic distance from the GPS 52 to the satellite 51 is also known if it is in the range of 300 km.

However, though the GPS receiver 52 is capable of determining the position of the C/A code in 300 km as codephase, it can not directly determine the integer portion (intMsec) of the C/A code. Therefore, in order to calculate the pseudo distance, it is necessary to detect the integer portions (intMsec) included in the pseudo distance every 300 km.

As the method for detecting the integer portion (intMsec) of the C/A code, a method of determining an integer portion (intMsec) using a GPS time which is detected by deciphering and calculating a Z count transmitted from the GPS satellite is known. With the method, it is possible to calculate the pseudo distance by assigning the detected integer portion (intMsec) to the following equation (1).

$$\text{intMsec} \times (\text{speed of light})/1{,}000 + \text{codephase} \qquad (1).$$

However, a receipt of the z count requires 6 seconds on the average, which is time consuming. Further, it is impossible to correctly receive the Z count depending on a situation of a receipt of a radio wave from the GPS satellite 51. In such case, it is possible to detect the integer portion (intMsec) of the C/A code by presuming an initial location of the GPS receiver 52, calculating the pseudo distance from the presumed initial location and a location of the GPA satellite 51, and then assigning the codephase determined by the GPS receiver 52 to the equation (1).

However, in the case where there is an error of more than about 300 km between the initial location of the GPS receiver 52 and the actual location of the GPS receiver 52, the value of the integer position (intMsec) is erroneously calculated because of the identical pattern of the C/A codes every 300 km. In order to avoid error in the calculation of the value of the integer portion (intMsec) of the C/A code, it is necessary to set the initial location in an area which is distant from the GPS receiver within 300 km or less.

It is possible to make it difficult to receive the radio wave due to a cliff effect in an area which is distant from a broadcasting relay station by more than 150 km by using the terrestrial digital broadcasting for the acquisition of the initial location to be used for the positioning, and, thus, it is possible to pinpoint the present location of the GPS receiver with an accuracy of about 150 km. Therefore, it is possible to suppress the distance between the initial location to be used for the positioning and the present location of the GPS receiver to be about 300 km or less, thereby making it possible to detect the distance between the satellite and the receiver without receiving the Z count transmitted from the satellite. As a result, it is possible to reduce the time required for the positioning by the GPS with the cost burden being suppressed and to improve the positioning accuracy by the GPS receiver even in the case where it is impossible to receive the Z count.

Though the terrestrial digital broadcasting is used in the foregoing embodiments for the acquisition of the initial location to be used for the positioning by way of example, broadcasting other than the terrestrial digital broadcasting may be used. In the case where a radio wave for the broadcasting does not include a broadcasting station ID, a frequency of the broadcasting radio wave may be used as the tuning information. In the case of using the terrestrial digital broadcasting, a location of a relay station may be specified by inserting ID information of the relay station in a vacant region of a data packet.

The location information (latitude, longitude, altitude) of the broadcasting station or the relay station may be acquired directly from the terrestrial digital broadcasting without referring to the correlation table 39a by directly inserting the location information of the broadcasting station or the relay station into a data packet of the terrestrial digital broadcasting.

In the case of using FM broadcasting, location information of a broadcasting station or a relay station may be inserted into a packet of textual information, so that the GPS receiver uses the location information as an initial location for positioning. Alternatively, in the case of using FM broadcasting, a broadcasting station may be specified based on information of a broadcasting station transmitted through FM subcarrier information, so that location information of a city in which the broadcasting station exists can be used as the initial location for positioning.

What is claimed is:

1. A positioning device comprising:
    a positioning unit for positioning a present location by receiving a radio wave from a satellite;
    a communication unit for acquiring a public broadcast communication and for determining a broadcast frequency of the public broadcast communication; and
    an initial location setting unit for determining an originating location of the public broadcast communication corresponding to the broadcast frequency and for setting an initial location of the positioning device as the originating location to be used for the positioning
    wherein the positioning unit calculates the present location based on the initial location and the radio wave.

2. The positioning device according to claim 1, wherein the initial location setting unit comprises:
    a first memory for storing information acquired by the communication unit;
    a second memory for storing a result of the positioning performed by the positioning unit;
    a comparison unit for comparing information acquired by the communication unit in a previous positioning with information acquired by the communication unit in a current positioning; and
    an estimation unit for estimating a distance between a current positioning location and a previous positioning location based on a result of the comparison,
    the previous positioning location being used as an initial location to be used for the current positioning in the case where the distance between the current positioning location and the previous positioning location is in a predetermined range.

3. The positioning device according to claim 2, wherein the estimation unit uses at least one of:
    IDs of receivable broadcasting stations;
    number of the receivable broadcasting stations;
    field intensities of received radio waves; and
    received frequencies,
    for the estimation of the distance between the current positioning location and the previous positioning location.

4. The positioning device according to any one of claims 1 to 3, wherein the public broadcast communication comprises at least one of:
    analog radio broadcasting;
    digital radio broadcasting;
    analog TV broadcasting;
    digital TV broadcasting; and
    a road traffic information communication.

5. The positioning device according to claim 4, wherein the digital TV broadcasting comprises terrestrial digital broadcasting.

6. The positioning device according to claim 1, further comprising a correlation table wherein the broadcasting frequency is correlated with at least one of location information of a broadcasting station and location information of a relay station of the broadcasting station.

7. The positioning device according to claim 6, wherein the initial location setting unit sets the initial location to be used for the positioning based on a result of reference to the correlation table.

8. A mobile terminal comprising:
- a positioning unit for positioning a present location by receiving a radio wave from a satellite;
- a communication unit for acquiring information indicating a broadcast frequency of a public broadcast communication;
- an initial location setting unit for determining an originating location corresponding to the broadcast frequency and for setting an initial location of the mobile terminal as the originating location to be used for the positioning; and
- a display for displaying a result obtained by the positioning unit;
- wherein the positioning unit calculates the present location based on the initial location and the radio wave.

9. A positioning method comprising:
- a step of acquiring information indicating a broadcast frequency of a public broadcast communication;
- a step of determining an originating location of the public broadcast communication corresponding to the broadcast frequency;
- a step of setting an initial location as the originating location;
- a step of receiving a radio wave from a satellite; and
- a step of calculating a present location based on the received radio wave and the set initial location.

10. A positioning program comprising causing a computer to execute:
- a step of acquiring information indicating a broadcast frequency of a public broadcast communication;
- a step of determining an originating location of a public broadcast communication corresponding to the broadcast frequency;
- a step of setting an initial location as the originating location;
- a step of receiving a radio wave from a satellite; and
- a step of calculating a present location based on the received radio wave and the set initial location.

* * * * *